(12) United States Patent
Paulus et al.

(10) Patent No.: US 12,552,699 B2
(45) Date of Patent: Feb. 17, 2026

(54) LAMINATED GLAZING

(71) Applicant: Pilkington Group Limited, Nr. Ormskirk (GB)

(72) Inventors: Peter Paulus, Muenster (DE); Joachim Pilz, Oer-Erkenschwick (DE)

(73) Assignee: Pilkington Group Limited, Nr. Ormskirk Lancashire (GB)

( * ) Notice: Subject to any disclaimer, the term of this patent is extended or adjusted under 35 U.S.C. 154(b) by 695 days.

(21) Appl. No.: 17/677,171

(22) Filed: Feb. 22, 2022

(65) Prior Publication Data

US 2022/0177346 A1 Jun. 9, 2022

Related U.S. Application Data

(63) Continuation of application No. 15/507,150, filed as application No. PCT/GB2015/052460 on Aug. 26, 2015, now abandoned.

(30) Foreign Application Priority Data

Aug. 27, 2014 (GB) .................................... 1415163

(51) Int. Cl.
  *C03B 23/03* (2006.01)
  *B32B 17/10* (2006.01)

(52) U.S. Cl.
  CPC .......... *C03B 23/03* (2013.01); *C03B 2225/02* (2013.01)

(58) Field of Classification Search
  None
  See application file for complete search history.

(56) References Cited

U.S. PATENT DOCUMENTS 2,392,770 A * 1/1946 Ryan ................. B32B 17/10926
  65/23
2,551,606 A * 5/1951 Jendrisak .............. C03B 23/027
  65/273
(Continued)

FOREIGN PATENT DOCUMENTS

CZ  300627 B6 *  7/2009  ............. C03B 23/03
DE  60114204 T2 *  7/2006  ............. C03B 23/03
(Continued)

OTHER PUBLICATIONS

International Search Report (PCT/ISA/210) issued on Nov. 16, 2015, by the European Patent Office as the International Searching Authority for International Application No. PCT/GB2015/052460.
(Continued)

*Primary Examiner* — Jodi C Franklin
(74) *Attorney, Agent, or Firm* — BUCHANAN INGERSOLL & ROONEY PC

(57) ABSTRACT

Methods of making a laminated glazing having reduced optical distortion when installed in a vehicle are described. The laminated glazing has first and second sheets of glazing material each separately shaped between a pair of shaping members that are then laminated together. The position for bending the first sheet of glazing material may be deliberately offset from the position for bending the second sheet of glazing material. During the lamination step, the first sheet of glazing material may be displaced relative to the second sheet of glazing material by a lateral and/or longitudinal positional displacement. The first and/or second sheet of glazing material may have been cut such that after lamination at least a portion of the peripheral edges thereof are aligned. Apparatus for shaping a sheet of glazing material for carrying out the aforementioned methods is also described, as is a resulting laminated glazing.

5 Claims, 8 Drawing Sheets

(56) References Cited

U.S. PATENT DOCUMENTS

| | | | |
|---|---|---|---|
| 3,700,542 A | 10/1972 | Harry et al. | |
| 4,093,438 A | 6/1978 | Currie et al. | |
| 4,260,408 A | 4/1981 | Reese et al. | |
| 4,398,979 A * | 8/1983 | Cathers | B32B 17/10972 156/87 |
| 4,666,492 A | 5/1987 | Thimons et al. | |
| 4,753,669 A | 6/1988 | Reese | |
| 4,756,735 A * | 7/1988 | Cathers | C03B 23/027 65/273 |
| 4,838,920 A | 6/1989 | Blasquez-Gonzales et al. | |
| 4,976,762 A * | 12/1990 | Anttonen | C03B 40/005 65/289 |
| 5,017,210 A | 5/1991 | Petitcollin et al. | |
| 5,154,117 A * | 10/1992 | Didelot | B32B 17/10862 100/168 |
| 5,169,423 A | 12/1992 | Nagai et al. | |
| 5,279,635 A | 1/1994 | Flaugher et al. | |
| 5,340,375 A * | 8/1994 | Anttonen | C03B 23/0252 65/273 |
| 5,743,931 A | 4/1998 | Flaugher et al. | |
| 5,833,729 A * | 11/1998 | Meunier | C03B 35/145 65/273 |
| 6,044,662 A * | 4/2000 | Morin | C03B 23/0252 65/106 |
| 6,602,371 B2 * | 8/2003 | Veerasamy | B32B 17/10761 427/249.7 |
| 7,459,199 B2 | 12/2008 | Horcicak et al. | |
| 2003/0154745 A1 * | 8/2003 | Garnier | C03B 35/202 65/273 |
| 2005/0061034 A1 | 3/2005 | Boisselle et al. | |
| 2006/0260359 A1 * | 11/2006 | Funk | C03B 29/08 65/106 |
| 2007/0138824 A1 * | 6/2007 | Yamada | C03B 23/0256 65/106 |
| 2007/0157671 A1 * | 7/2007 | Thellier | C03B 23/0357 65/106 |
| 2008/0245107 A1 | 10/2008 | Bennett et al. | |
| 2009/0000334 A1 * | 1/2009 | Boisselle | C03B 23/0352 65/106 |
| 2009/0084138 A1 * | 4/2009 | Imaichi | C03B 23/0357 65/106 |
| 2009/0320523 A1 * | 12/2009 | Fukami | C03B 23/0305 65/290 |
| 2010/0229602 A1 * | 9/2010 | Ross | C03B 23/0252 65/323 |
| 2012/0070624 A1 * | 3/2012 | Payen | B32B 17/10036 65/106 |
| 2014/0011000 A1 * | 1/2014 | Dunkmann | B60J 1/008 65/106 |
| 2014/0093702 A1 * | 4/2014 | Kitajima | B32B 17/10045 65/24 |
| 2014/0141206 A1 * | 5/2014 | Gillard | B32B 17/10137 428/174 |
| 2015/0122406 A1 * | 5/2015 | Fisher | B32B 17/10743 156/222 |
| 2015/0202854 A1 * | 7/2015 | Tsuchiya | C03C 3/087 428/179 |
| 2015/0224855 A1 * | 8/2015 | Legrand | B60J 1/008 52/204.62 |
| 2015/0232366 A1 * | 8/2015 | Fredholm | C03B 23/03 65/290 |
| 2015/0314571 A1 * | 11/2015 | Cites | C03C 3/097 501/63 |
| 2016/0250982 A1 * | 9/2016 | Fisher | B32B 17/06 428/215 |
| 2016/0297169 A1 * | 10/2016 | Notsu | B32B 17/10119 |

FOREIGN PATENT DOCUMENTS

| | | | | |
|---|---|---|---|---|
| EP | 0245175 A1 * | 11/1987 | | C03B 23/035 |
| EP | 0398759 A2 * | 5/1990 | | B32B 17/10 |
| EP | 0884285 A2 * | 12/1998 | | C03B 23/027 |
| EP | 0989101 A2 | 3/2000 | | |
| EP | 1801079 A1 | 6/2007 | | |
| FR | 2594812 A1 * | 8/1987 | | C03C 8/245 |
| WO | 2004085324 A1 | 10/2004 | | |
| WO | 2005033026 A1 | 4/2005 | | |

OTHER PUBLICATIONS

Written Opinion (PCT/ISA/237) issued on Nov. 16, 2015, by the European Patent Office as the International Searching Authority for International Application No. PCT/GB2015/052460.

* cited by examiner

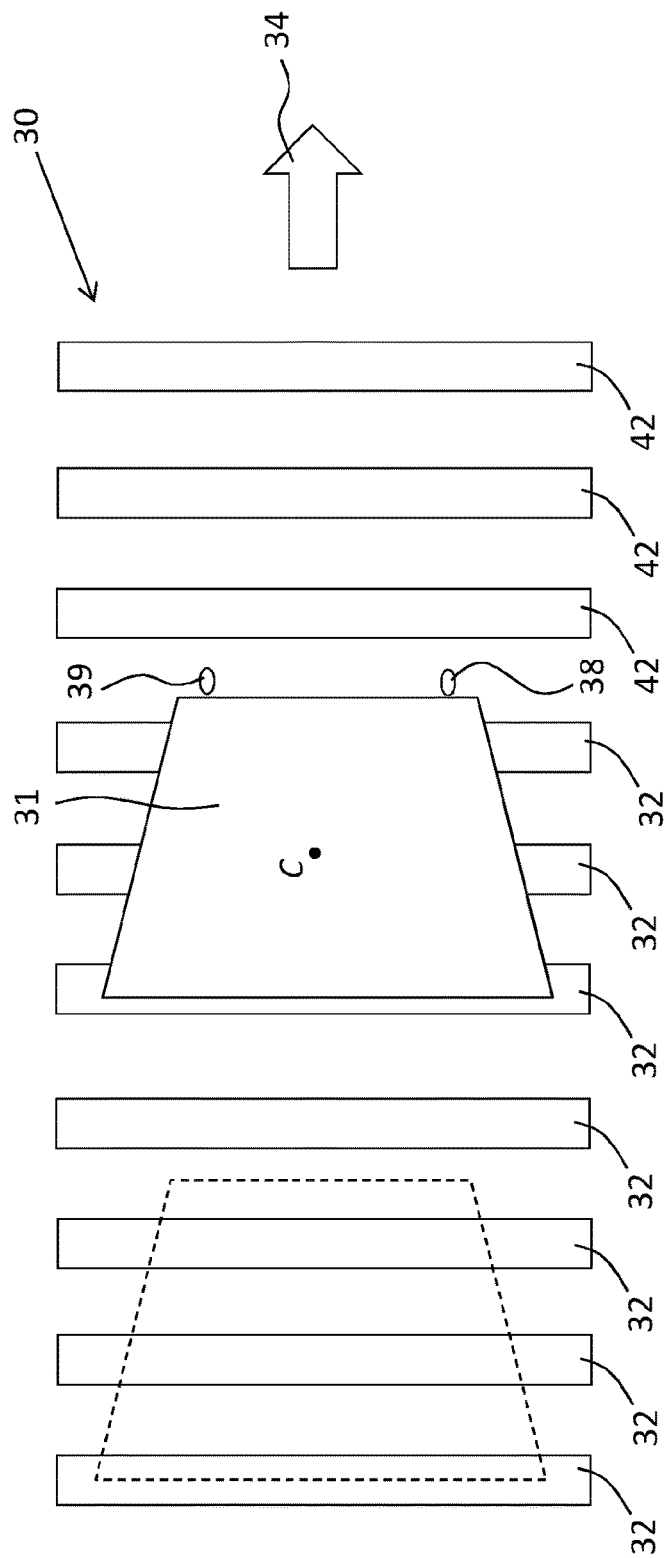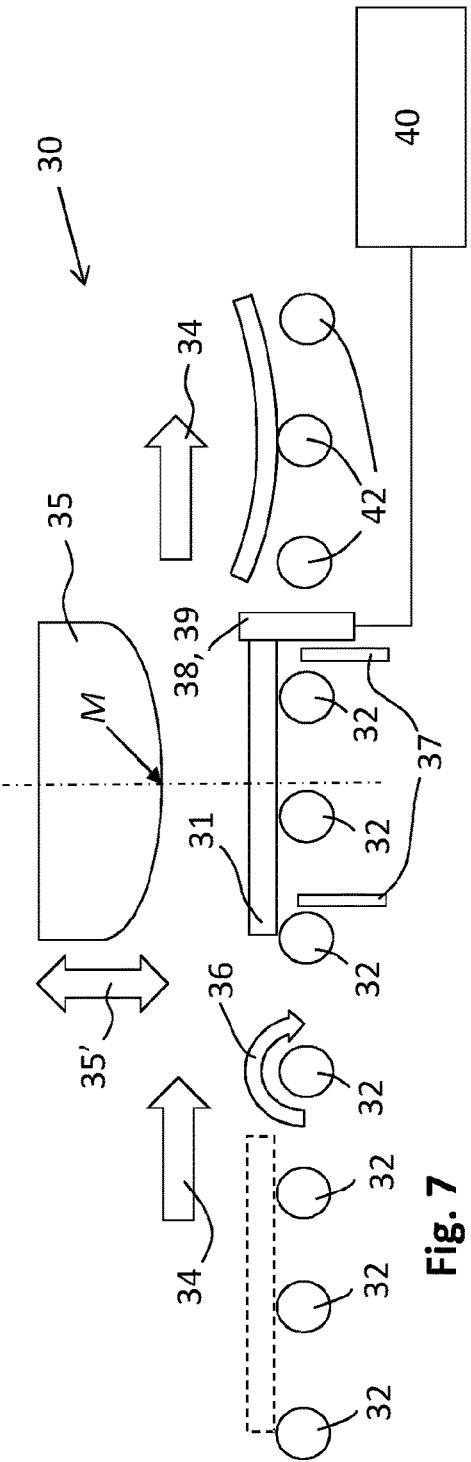
Fig. 6
Fig. 7

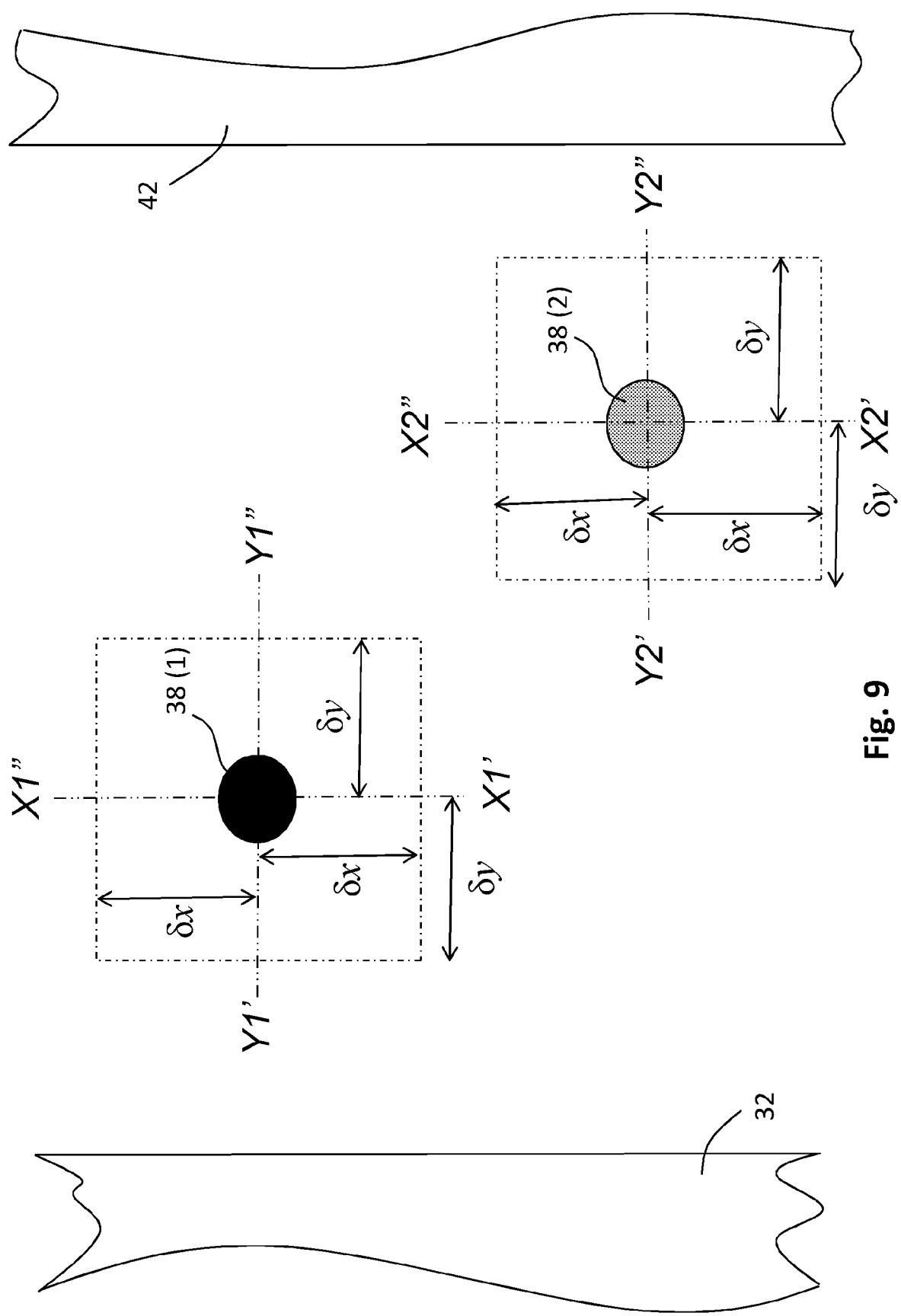

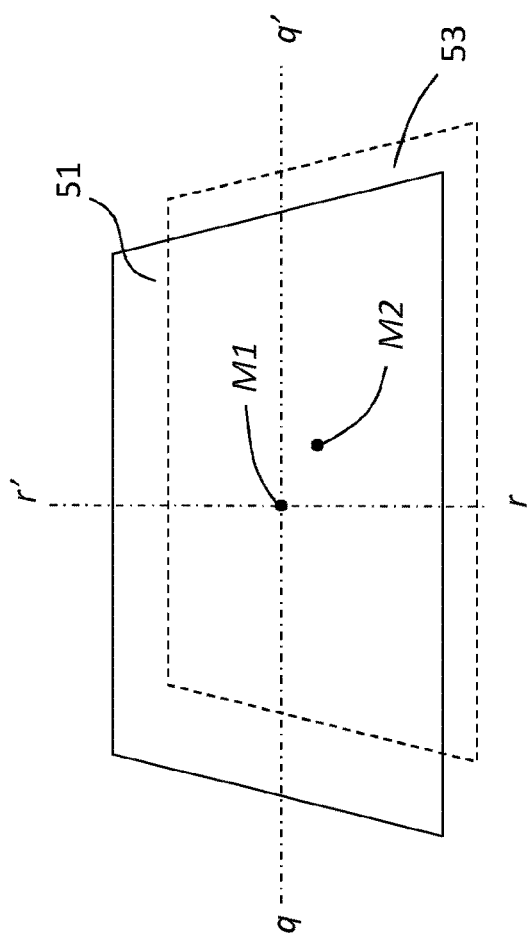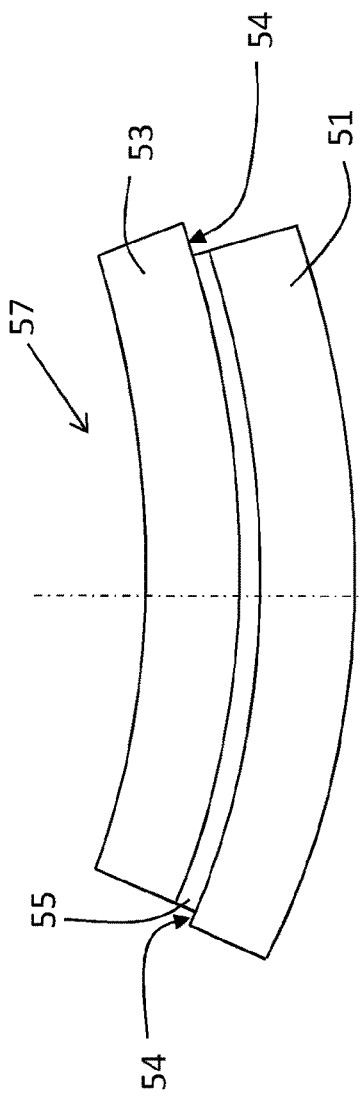

LAMINATED GLAZING

The present application is a Continuation of U.S. application Ser. No. 15/507,150 filed Feb. 27, 2017, which is the U.S. National Stage of PCT/GB2015/052460 filed Aug. 26, 2015, and claims the benefit of Great Britain Application No. 1415163.3 filed Aug. 27, 2014, the entire content of each of which is incorporated by reference herein.

The present invention relates to a method of making a laminated glazing, an apparatus for shaping sheets of glazing material for use in making a laminated glazing, and to a laminated glazing.

It is known that a laminated glazing for a vehicle windscreen usually comprises two bent sheets of glass joined by at least one adhesive layer, usually polyvinyl butyral (PVB). It is conventional in the art to refer to each glass sheet as a "ply". Often the adhesive layer is referred to as a "ply" i.e. a ply of PVB. The glass sheet configured to face the interior of the vehicle in which the laminated glazing is installed is often known as the "inner ply" and the glass sheet configured to face the exterior of the vehicle in which the laminated glazing is installed is often known as the "outer ply".

Each of the sheets of glass used in a laminated glazing for a vehicle is usually bent in one or two mutually perpendicular directions such that the laminated glazing is curved and many methods are known for bending initially flat glass sheets to a desired curvature.

One known method is to bend a pair of glass sheets at the same time, one sheet of glass on top of another and separated with a suitable "parting powder" such as calcium carbonate. The inner ply and outer ply are bent at the same time by gravity sag bending.

Another method is to bend the inner ply and the outer ply at different times, usually one after the other, thereby forming the inner ply and the outer ply individually.

One such method of bending the flat glass sheets individually involves conveying heated flat glass sheets between a pair of complementary shaping members and press bending each glass sheet separately. The glass sheets can then be cooled, brought together and laminated using a suitable adhesive interlayer such as PVB. Such methods are described in EP0398759A2 and WO2004/085324A1.

U.S. Pat. No. 4,260,408 relates to the shaping of glass sheets to be laminated and describes a cycle of operation where a pair of glass is initially sag bent by gravity followed by a press bending step.

It is conventional in the field of press bending heat softened glass sheets to locate each glass sheet in the bending position transporting the glass sheets on conveyor rolls that cause the leading edge of the glass sheet to be carried against positive stops which hold the glass sheet in position between the complementary bending members. The glass sheet is then usually lifted from the conveyor rolls and pressed between the mould members to form the desired curvature.

As is known from U.S. Pat. No. 4,753,669, press bending shaping members are often covered with a covering of a knitted fibre or knitted wire mesh. In U.S. Pat. No. 4,753,669 it is noted that certain woven wire screens are used in combination with fibre glass covers to increase the useful life thereof. However such wire screens may wrinkle when stretched across or pressed against compound and/or complex surfaces. The wrinkles cause irregularities in the pressing surface that may be transferred to the pressed glass sheets, causing optical distortion. U.S. Pat. No. 4,753,669 addresses this problem by providing a knitted wire mesh superimposed over an insulating material layer. The knitted wire mesh is said to provide a smooth pressing surface.

A press bending station is described in WO2005/033026A1 that includes an annular mould and a full-face mould. Holes, selectively connected to a negative pressure source, are placed in portions of the full face mould that are determined by the configuration of the annular mould when the annular mould comes into contact with a heated glass sheet during the press bending process. The heated glass sheet is drawn by negative pressure through the holes towards the full-face mould and thus acquires its shape. The full-face mould may be covered by at least one fine mesh cloth i.e. woven stainless steel.

However as optical quality requirements have become more stringent, stainless steel woven cloth covers of the type described in U.S. Pat. No. 4,753,669 have still been found to produce slight deformations in the glass surface that results in an increased optical distortion in transmission i.e. when looking through the glass, in particular when the glass is inclined at an angle to the direction of vision, as is typical when the laminated glazing is installed in a vehicle as a front windscreen.

The contact of the shaping member with the glass surface slightly deforms the glass surface to produce an imprint on the major surface of the press-bent glass sheet that has been in contact with the shaping member. To the naked eye, the imprint is not visible.

It is known from "Glass Processing Days, 2003, pages 502-504 that the angle of installation of a vehicle windscreen has an effect on the optical properties. For example, the amplification of optical power varies with installation angle. Therefore as the angle of installation increases a much better optical quality is required because any faults present in the windscreen are amplified to a higher degree. One option is to improve the optical quality of the glass used to make the laminated windscreen, but it is not always possible to produce glass of improved optical quality at an acceptable commercial yield.

There is therefore a need for a method of making a laminated glazing that has reduced optical distortion when installed in a vehicle and to an apparatus for carrying out the method.

Accordingly from a first aspect the present invention provides a method of making a laminated glazing comprising the steps:
  (i) transporting a first sheet of glazing material in a first direction between a pair of shaping members;
  (ii) positioning the first sheet of glazing material with positioning means such that the first sheet of glazing material is at a first position for bending between the pair of shaping members;
  (iii) shaping the first sheet of glazing material between the pair of shaping members;
  (iv) transporting the first sheet of glazing material away from between the pair of shaping members;
  (v) transporting a second sheet of glazing material between the pair of shaping members;
  (vi) positioning the second sheet of glazing material with positioning means such that the second sheet of glazing material is at a second position for bending between the pair of shaping members;
  (vii) shaping the second sheet of glazing material between the pair of shaping members,
  (viii) transporting the second sheet of glazing material away from between the pair of shaping members; and (ix) using suitable lamination conditions to laminate the shaped first sheet of glazing material to the shaped second sheet of glazing material via at least one adhesive sheet, wherein the first position for bending is deliberately offset from the second position for bending.

The first position for bending and the second position for bending are selected such that the first and second sheets of glazing material, when shaped in steps (iii) and (vii) respectively are able to be suitably paired to make the laminated glazing in step (ix).

A method in accordance with the present invention allows a laminated glazing to be made that has higher optical quality in transmission when measured at an angle through the laminated glazing, for example when installed in a vehicle, compared to when the optical quality is measured at normal incidence through the laminated glazing.

Suitably the positioning means has a longitudinal tolerance in a direction parallel to the first direction such that a reference point on a reference sheet of glazing material is positionable at a target location in a direction parallel to the first direction to within the longitudinal tolerance. For the avoidance of doubt by "longitudinal" it is meant that direction parallel to the direction of travel of the first sheet of glazing material. That is, the longitudinal direction is parallel to the first direction.

The longitudinal tolerance of the positioning means is the statistical variation of the location of the reference point on the reference sheet of glazing material of the for a target longitudinal location X.

If the longitudinal tolerance is $\delta x$, then a reference point on a reference sheet of glazing material is positionable at the target longitudinal location X to within $\pm \delta x$. Typically the longitudinal tolerance is symmetrical, but it may be unsymmetrical. When the longitudinal tolerance is symmetrical, the magnitude of the longitudinal tolerance is $2\delta x$.

If the longitudinal tolerance is not symmetrical then the reference point on the reference sheet of glazing material is positionable at the target longitudinal location X to within $X+\delta x_1$ and $X-\delta x_2$ where $\delta x_1$ is the longitudinal tolerance on one side of the location X and $\delta x_2$ is the longitudinal tolerance on the other side of the location X When the longitudinal tolerance is not symmetrical, the magnitude of the longitudinal tolerance is $|\delta x_1|+|\delta x_2|$.

In general terms the longitudinal tolerance may be specified as a function $f(x)$ such that a reference point on a reference sheet of glazing material is positionable at a target longitudinal location X to within $\pm f(x)$.

As an example if the longitudinal tolerance of the positioning means is 1 mm and symmetrical and the target location in the longitudinal direction is 30000 mm from a fixed datum, the positioning means is able to position a reference point on a reference sheet of glazing material at a position of between 29999 mm and 30001 mm from the fixed datum. That is, 30000±1 mm from the fixed datum. In this example the magnitude of the longitudinal tolerance is 2 mm.

Suitably the positioning means has a lateral tolerance in a direction perpendicular to the first direction such that a reference point on a reference sheet of glazing material is positionable at a target location in a direction parallel to the first direction to within the lateral tolerance. For the avoidance of doubt, by "lateral" it is meant that direction perpendicular to the direction of travel of the first sheet of glazing material. That is, the lateral direction is perpendicular to the first direction.

The lateral tolerance of the positioning means is the statistical variation of the location of the reference point on the reference sheet of glazing material for a target lateral location Y.

If the lateral tolerance is $\delta y$, then a reference point on a reference sheet of glazing material is positionable at the target longitudinal location Y to within $\pm \delta y$. Typically the lateral tolerance is symmetrical, but it may be unsymmetrical. When the longitudinal tolerance is symmetrical, the magnitude of the lateral tolerance is $2\delta y$.

If the lateral tolerance is not symmetrical then the reference point on the reference sheet of glazing material is positionable at the target lateral location Y to within $Y+\delta y_1$ and $Y-\delta y_2$ where $\delta y_1$ is the lateral tolerance on one side of the location Y and $\delta y_2$ is the lateral tolerance on the other side of the location Y.

In general terms the lateral tolerance may be specified as a function $f(y)$ such that a reference point on a reference sheet of glazing material is positionable at a target lateral location Y to within $\pm f(y)$.

As an example if the lateral tolerance of the positioning means is 2 mm and symmetrical and the target location in the lateral direction is 20000 mm from a fixed datum, the positioning means is able to position a reference point on a reference sheet of glazing material at a position of between 19998 mm and 20002 mm from the fixed datum. That is, 20000±2 mm from the fixed datum. In this example the magnitude of the longitudinal tolerance is 4 mm.

Typically the lateral tolerance is less than 2.0 mm i.e. between 0.001 mm and 1.999 mm, preferably less than 1.5 mm, more preferably less than 1.0 mm, even more preferably less than 0.5 mm, even more preferably between 0.001 mm and 0.5 mm, most preferably between 0.01 mm and 0.2 mm.

Typically the longitudinal tolerance is less than 2.0 mm i.e. between 0.001 mm and 1.999 mm, preferably less than 1.5 mm, more preferably less than 1.0 mm, even more preferably less than 0.5 mm, even more preferably between 0.001 mm and 0.5 mm, most preferably between 0.01 mm and 0.2 mm.

In prior art methods used to individually shape first and second sheets of glass between a pair of shaping members, the aim is to position each sheet of glass at the same position to within the lateral tolerance and the longitudinal tolerance of the positioning means such that the first and second sheets of glass are a congruent pair.

In such prior art methods the target position for bending each sheet of glazing material is that position between the shaping members such that when the sheet of glazing material is shaped between the shaping members, the shape imparted to the sheet of glazing material is the desired shape. Typically the desired shape is defined in terms of a CAD model and there may be slight deviations in the shape that is actually produced after bending between the pair of shaping members and the CAD model. Such deviations are usually specified by the customer and the manufacturing process is typically configured to deliver a product to an agreed specification.

The two glass plies which, together with a ply of adhesive interlayer material, make up a standard automotive laminated window, are for convenience referred to as the inner and outer ply respectively, according to which of the plies forms the inner and outer surfaces of the window when installed in its intended position in a vehicle. Each ply has two major faces, and after lamination, the ply of interlayer material adheres to opposed major faces of the glass plies.

For a laminated window of shallow curvature of large radius, it is acceptable for both plies to be the same size (referring to the size of the flat glass sheet as cut, which is then fed onto the bending line) and bent to the same curvature. Such plies need not be distinguished during bending, or, at any rate, the inner and outer plies can be bent on the same bending equipment on the same bending line if desired. However, other windscreen designs frequently require the glass to possess deep or sharp (small radius) or complex curvature, or indeed most or all of these characteristics. To achieve reliable lamination without excessive breakage, it is important for the glass plies to nest together well, that is to say, the glass plies should fit together well when assembled, i.e. when superimposed in the correct order with a ply of interlayer material in between the glass plies. The plies will only nest accurately if the curvatures of their proximate opposed major faces match, after due allowance for the thickness of the interlayer. To put it another way, if one considers corresponding small portions of each of the glass plies (portions which are small enough for their curvature to be considered to be circular), the curvature of such portions needs to be concentric when they are adjacent each other in the assembled condition if they are to nest accurately. From a consideration of the geometry involved, it will be appreciated that one glass ply (for a windscreen, the inner ply) needs to be of slightly smaller size and bent to slightly smaller radii of curvature so that the plies nest accurately. The term "congruent pair", as herein employed, includes a pair comprising inner and outer plies of slightly different sizes as just described.

Whilst the nesting is important, bent glass sheets with a large radius of curvature are less sensitive to the change in curvature so the inner and outer glass plies can often be shaped with the same degree of curvature and successfully laminated, providing there are no rapid changes of curvature When the first and second sheets of glazing material have the same, or substantially the same, outline shape, the target position for bending is the same for each of sheet and is typically the geometric centre of the major surface or the centre of mass of the sheet. When one of the first and second sheets of glazing material is of a slightly different size, as described above, the first and second sheets of glazing material have a similar shape so typically the target position for bending each sheet is usually such that the geometric centre (or centre of mass) of each sheet is positioned at the same place in relation to the shaping members. Given that positioning means typically act upon an edge of a sheet of glazing material, in order to align the geometric centres of the first and second sheets of glazing material at the same positions in relation to the shaping members, the positioning means compensates for the size difference between the first and second sheets of glazing material. For example, if the inner ply is shorter in the direction of conveyance then the positioning means are moved upstream to compensate. That is, if the downstream edge of the inner ply is displaced relative to the downstream edge of the outer ply by k mm, the positioning means may be moved k mm upstream such that the central bending point of the first and second plies remains at the same position relative to the shaping members.

The present invention aims to deliberately offset the bending position of the first sheet of glazing material with respect to the bending position of the second sheet of glazing material.

This allows a consistently high optical quality laminated glazing to be produced during a production run. The degree of displacement of the first position for bending and the second position for bending should not be too excessive so that high lamination stresses are avoided. If lamination stresses become too high, it is difficult, and in extreme cases not possible, to make the laminated glazing.

Suitably the first position is offset from the second position by a lateral displacement being greater than the lateral tolerance and/or a longitudinal displacement being greater than the longitudinal tolerance.

Suitably when the first sheet of glazing material is at the first position the positioning means are in a first configuration and when the second sheet of glazing material is at the second position the positioning means are in a second configuration.

Suitably when the positioning means are in the first configuration, a reference point on a reference sheet of glazing material positioned by the positioning means between the pair of shaping members is at a first location.

Suitably when the positioning means are in the second configuration, the reference point on the reference sheet of glazing material positioned by the positioning means between the pair of shaping members is at a second location.

Suitably the first location is displaced relative to the second location by a lateral positional displacement being greater than the lateral tolerance and/or a longitudinal positional displacement being greater than the longitudinal tolerance.

Usually the lateral positional displacement is the same as the lateral displacement.

Usually the longitudinal positional displacement is the same as the longitudinal displacement.

For the avoidance of doubt in a preferred embodiment of the first aspect of the present invention there is provided a method of making a laminated glazing comprising the steps:

(i) transporting a first sheet of glazing material in a first direction between a pair of shaping members;

(ii) positioning the first sheet of glazing material with positioning means such that the first sheet of glazing material is at a first position for bending between the pair of shaping members, the positioning means having a lateral tolerance in a direction perpendicular to the first direction and a longitudinal tolerance in a direction parallel to the first direction such that the positioning means is able to position a reference point on a reference sheet of glazing material between the pair of shaping members at a target location to within the lateral tolerance and to within the longitudinal tolerance;

(iii) shaping the first sheet of glazing material between the pair of shaping members;

(iv) transporting the first sheet of glazing material away from between the pair of shaping members;

(v) transporting a second sheet of glazing material between the pair of shaping members;

(vi) positioning the second sheet of glazing material with positioning means such that the second sheet of glazing material is in a second position for bending between the pair of shaping members, (vii) shaping the second sheet of glazing material between the pair of shaping members, (viii) transporting the second sheet of glazing material away from between the pair of shaping members; and (ix) using suitable lamination conditions to laminate the first sheet of glazing material to the second sheet of glazing material via at least one adhesive sheet, wherein the first position and the second position are selected such that the first sheet and second sheet, when shaped, are able to be paired to make the laminated glazing, further wherein when the first sheet of glazing material is at the first position the positioning means are in a first configuration and when the second sheet of glazing material is at the second position the positioning means are in a second configuration, characterised in that when the positioning means are in the first configuration and the reference sheet of glazing material is positioned by the positioning means between the pair of shaping members, the reference point on the reference sheet of glazing material is at a first location, and when the positioning means are in the second configuration and the reference sheet of glazing material is positioned by the positioning means between the pair of shaping members, the reference point on the reference sheet of glazing material is at a second location, wherein the first location is displaced relative to the second location by a lateral positional displacement being greater than the lateral tolerance and/or a longitudinal displacement being greater than the longitudinal tolerance.

The reference point on the reference sheet of glazing material may be anywhere on a major surface thereof. Suitably the reference point on the sheet of glazing material is at the geometric centre of the major surface or the centre of mass of the reference sheet of glazing material.

As is conventional in the art, a bent vehicle windscreen typically has the peripheral edges of the inner and outer plies aligned. As discussed above, this is achieved by cutting the inner ply slightly smaller than the outer ply. For curvature about one axis only, the inner glass ply is cut to be slightly shorter in the direction perpendicular to the axis of bending. For bending in two directions, the inner glass ply is cut to be smaller in both directions.

It is to be understood that during assembly, i.e. the process where the first and second sheets of glazing material are combined with a sheet of adhesive such as PVB (i.e. at step (viii)), conventionally the two glasses are adjusted centrally so there is no misalignment between the sheets of glazing material.

It will be readily apparent that by using positioning means having worse positional accuracy, such that the magnitude of the lateral and/or longitudinal tolerance is increased (for example a larger δx and/or δy), the likelihood of making a laminated glazing having an improved optical distortion in transmission increases. However the randomness associated with this approach means it is not possible to deliver consistent quality over a production run.

It will also be readily apparent that as the installation angle changes, the amount of offset required also changes. By using the optical path of horizontal light rays passing through a curved laminated glazing inclined at an angle to the vertical, it is possible to derive the following equation for the deviation of the horizontal light ray as it passes through the curved laminated glazing:

$$d \times \tan\left(\sin^{-1}\left(\frac{1}{n} \times \sin\theta_{h,v}\right)\right) \quad (1)$$

Where d is the overall thickness of the laminated glazing in millimetres, n is the refractive index of the glazing material at 540 nm, and $\theta_{h,v}$ is the intended installation angle of the laminated glazing (relative to a horizontal orientation $\theta_h$ or a vertical orientation $\theta_v$).

It is possible using equation (1) to calculate the amount of offset required.

In accordance with the present invention the first position for shaping the first sheet of glazing material is deliberately offset relative to the second position for bending the second sheet of glazing material.

Preferably longitudinal displacement and/or the lateral displacement and/or the longitudinal positional displacement and/or the lateral positional displacement is less than or equal to $$m \times d \times \tan\left(\sin^{-1}\left(\frac{1}{n} \times \sin\theta_{h,v}\right)\right)$$

where d is the overall thickness of the laminated glazing in millimetres, n is the refractive index of the glazing material at 540 nm, and $\theta_{h,v}$ is the intended installation angle of the laminated glazing relative to a horizontal orientation ($\theta_h$) or a vertical orientation ($\theta_v$) and m is less than or equal to 5, more preferably less than or equal to 4, even more preferably less than or equal to 3, most preferably less than or equal to 2.

Preferably longitudinal displacement and/or the lateral displacement and/or the longitudinal positional displacement and/or the lateral positional displacement is less than or equal to $$d \times \tan\left(\sin^{-1}\left(\frac{1}{n} \times \sin\theta_{h,v}\right)\right)$$

where d is the overall thickness of the laminated glazing in millimetres, n is the refractive index of the glazing material at 540 nm, and $\theta_{h,v}$ is the intended installation angle of the laminated glazing relative to a horizontal orientation ($\theta_h$) or a vertical orientation ($\theta_v$).

For example, for a vehicle windscreen consisting of two plies of soda-lime-silica glass having a thickness of 2.1 mm joined by a 0.76 mm thick ply of polyvinyl butyral the thickness of the resulting laminated glass is 4.96 mm. Therefore in the equation above, d=4.96 mm, n=1.52 and for an installation angle of 60° from the vertical ($\theta_v$=60°), the positional displacement is 3.4387 mm.

Preferably the lateral positional displacement and/or longitudinal positional displacement and/or lateral displacement and/or longitudinal displacement is between $$3/2 \times d \times \tan\left(\sin^{-1}\left(\frac{1}{n} \times \sin\theta_{h,v}\right)\right)$$

and $$1/2 \times d \times \tan\left(\sin^{-1}\left(\frac{1}{n} \times \sin\theta_{h,v}\right)\right).$$

The formula in equation (1) applies when the laminated glazing has a plurality of sheets of glazing material of similar refractive index and a plurality of sheets of adhesive interlayer having a similar refractive index to the refractive index of the sheets of glazing material.

For example, the above formula applies for a laminated glazing having two sheets of soda-lime-silica glass joined by an interlayer structure consisting of two or three sheets of polyvinyl butyral. The above formula applies equally for a laminated glazing having three sheets of soda-lime-silica glass joined by two sheets of polyvinyl butyral.

If the refractive index of the sheets of interlayer material and/or sheets of glazing material vary significantly from that of a soda-lime-silica glass then the above formula is modified accordingly.

Preferably d is between 2 mm and 10 mm.

Preferably n is between 1.5 and 1.8, more preferably 1.52.

Preferably $\theta_v$ is between 20° and 80°, more preferably between 50° and 70°.

Preferably $\theta_h$ is between −45° and +45°, more preferably 0°.

Preferably the lateral positional displacement and/or the longitudinal positional displacement vary between a lower limit and an upper limit. The lower limit for the lateral positional displacement and/or the longitudinal positional displacement is 0.5 mm, or 1.0 mm or 1.5 mm or 2.0 mm. The upper limit for the lateral positional displacement and/or the longitudinal positional displacement is 1.0 mm, or 1.5 mm, or 2.0 mm, or 2.5 mm, or 3.0 mm, or 3.5 mm, or 4.0 mm, or 4.5 mm, or 5.0 mm, or 5.5 mm, or 6.0 mm, or 6.5 mm, or 7.0 mm, or 7.5 mm, or 8.0 mm. For example, the lateral positional displacement and/or the longitudinal positional displacement is between 0.5 mm and 8.0 mm, more preferably between 1.5 mm and 7.0 mm, even more preferably between 1.5 mm and 6.0 mm, most preferably 1.5 and 4.0 mm. Other combination of lower and upper limit is possible.

Preferably the lateral displacement and/or the longitudinal displacement vary between a lower limit and an upper limit. The lower limit for the lateral displacement and/or the longitudinal displacement is 0.5 mm, or 1.0 mm or 1.5 mm or 2.0 mm. The upper limit for the lateral displacement and/or the longitudinal displacement is 1.0 mm, or 1.5 mm, or 2.0 mm, or 2.5 mm, or 3.0 mm, or 3.5 mm, or 4.0 mm, or 4.5 mm, or 5.0 mm, or 5.5 mm, or 6.0 mm, or 6.5 mm, or 7.0 mm, or 7.5 mm, or 8.0 mm. For example, the lateral displacement and/or the longitudinal displacement is between 0.5 mm and 8.0 mm, more preferably between 1.5 mm and 7.0 mm, even more preferably between 1.5 mm and 6.0 mm, most preferably 1.5 and 4.0 mm. Other combination of lower and upper limit is possible.

An alternative method for improving the optical quality is to bend the first and second sheets of glazing material such that the first and second positions for bending are the same to within the lateral tolerance and the longitudinal tolerance of the positioning means. The first and second sheets of glazing material are then offset relative to each prior to the first and second sheets of glazing material being laminated together. The amount of offset during the lamination step is such that the first and second sheets of glazing material are still able to be joined by the at least one adhesive sheet to make the laminated glazing.

Accordingly the present invention provides from a second aspect a method of manufacturing a laminated glazing comprising the steps:

(i) transporting a first sheet of glazing material between a pair of shaping members;
(ii) positioning the first sheet of glazing material with positioning means such that the first sheet of glazing material is at a first position for bending between the pair of shaping members;
(iii) shaping the first sheet of glazing material between the pair of shaping members;

(iv) transporting the first sheet of glazing material away from between the first pair of shaping members;
(v) transporting a second sheet of glazing material between the pair of shaping members;
(vi) positioning the second sheet of glazing material with positioning means such that the second sheet of glazing material is at a second position for bending between the pair of shaping members;
(vii) shaping the second sheet of glazing material between the pair of shaping members;
(viii) transporting the second sheet of glazing material away from between the first pair of shaping members; and
(ix) using suitable lamination conditions to laminate the first sheet of glazing material to the second sheet of glazing material via at least one adhesive sheet, characterised in that the when the first sheet of glazing material is positioned relative to the second sheet of glazing material during the lamination step, the first sheet of glazing material is displaced relative to the second sheet of glazing material by a lateral positional displacement and/or a longitudinal positional displacement.

The first position and the second position are selected such that the first sheet and second sheet, when shaped, are a congruent pair.

Suitably the positioning means has a longitudinal tolerance in a direction parallel to the first direction such that a reference point on a reference sheet of glazing material is positionable at a target location in a direction parallel to the first direction to within the longitudinal tolerance.

Suitably the positioning means has a lateral tolerance in a direction perpendicular to the first direction such that a reference point on a reference sheet of glazing material is positionable at a target location in a direction parallel to the first direction to within the lateral tolerance.

Preferably the first position and the second position are the same to within the lateral tolerance.

Preferably the first position and the second position are the same to within the longitudinal tolerance.

To define the first position of the first sheet of glazing material it is helpful to consider a reference point on the sheet of glazing material. The pair of shaping members are configured such that when the reference point on the sheet of glazing material are aligned with a fixed reference point on the shaping members, the desired curvature may be imparted to the sheet of glazing material. Each of the inner and outer plies are shaped in this way, with the appropriate reference point on the glazing being aligned with the reference points on the shaping members to achieve the desired degree of shaping. Due to the tolerance in the positioning means, it is possible to position the reference point on the sheet of glazing material to within the lateral and/or longitudinal tolerance of the positioning means.

Assuming the inner ply is cut in the conventional manner it is possible to offset the inner ply relative to the outer ply such that the optical distortion at an installation angle is reduced.

The disadvantage with this approach is that if the plies are cut in a conventional manner, at least one of the peripheral edges of the laminated glazing will not be aligned. This could be reduced by cutting the inner ply to a suitable external configuration such that the edges do align.

However given that by offsetting the plies the inner and outer plies no longer nest as precisely together, lamination stresses may be increased. In some embodiments the conditions for lamination are varied such that lamination stresses are reduced. For example the time and/or temperature of steps during the lamination process may be varied to improve flow of the adhesive sheet. The autoclave process may be varied (temperature and/or time to improve the adhesive sheet flow thereby reducing lamination stresses)

The misaligned edges may be hidden from view by appropriate encapsulation to cover the edges of the laminate. Such encapsulation is known in the art, for example use of polyurethane gaskets.

From a third aspect the present invention provides a method of manufacturing a laminated glazing comprising the steps:
(i) transporting a first sheet of glazing material between a pair of shaping members;
(ii) positioning the first sheet of glazing material with positioning means such that the first sheet of glazing material is at a first position for bending between the pair of shaping members,
(iii) shaping the first sheet of glazing material between the pair of shaping members;
(iv) transporting the first sheet of glazing material away from between the pair of shaping members;
(v) transporting a second sheet of glazing material between the pair of shaping members;
(vi) positioning the second sheet of glazing material with positioning means such that the second sheet of glazing material is at a second position between the pair of shaping members;
(vii) shaping the second sheet of glazing material between the pair of shaping members;
(viii) transporting the second sheet of glazing material away from between the pair of shaping members; and
(ix) laminating the first sheet of glazing material to the second sheet of glazing material via at least one adhesive sheet,
characterised in that the when the first sheet of glazing material is positioned relative to the second sheet of glazing material during the lamination step, the first sheet of glazing material is displaced relative to the second sheet of glazing material and wherein the first sheet of glazing material and/or the second sheet of glazing material have been cut such that after lamination at least a portion of the peripheral edges of the first and/or second sheets of glazing material are aligned.

Suitably the positioning means has a lateral tolerance and a longitudinal tolerance such that the positioning means is able to position a reference point on a reference sheet of glazing material between the pair of shaping members to within the lateral tolerance and the longitudinal tolerance Preferably the first and/or second sheet of glazing material has been cut prior to being shaped, such that if the first and second sheets of glazing material were shaped in a conventional manner they would not form a congruent pair.

Preferably the first and/or second sheet of glazing material has been cut after being shaped.

From a fourth aspect the present invention provides apparatus for shaping a sheet of glazing material, in particular a glass sheet, the apparatus comprising:
(i) a pair of shaping members,
(ii) means for transporting the sheet of glazing material between the pair of shaping members and
(iii) positioning means for positioning the sheet of glazing material at a position for bending between the pair of shaping members, wherein the positioning means has a lateral tolerance and a longitudinal tolerance; and
(iv) control means for controlling the configuration of the positioning means, wherein the control means is able to place the positioning means in a first configuration, such that with the positioning means in the first configuration, a reference sheet of glazing material is positionable between the pair of shaping members and a reference point on the reference sheet of glazing material is at a first lateral position and/or a first longitudinal position, and wherein the control means is able to place the positioning means in a second configuration, such that with the positioning means in the second configuration, the reference sheet of glazing material is positionable between the pair of shaping members and the reference point on the reference sheet of glazing material is at a second lateral position and/or a second longitudinal position, the first lateral position being displaced relative to the second lateral position by more than the lateral tolerance and/or the first longitudinal position being displaced relative to the second longitudinal position by more than the longitudinal tolerance.

By using an apparatus according to the fourth aspect of the present invention a first sheet of glazing material shaped between the pair of shaping members with the positioning means in the first configuration, and a second sheet of glazing material shaped between the pair of shaping members with the positioning means in the second configuration are able to be laminated together with an adhesive ply to produce a laminated glazing, in particular an automotive windscreen, having an improved optical quality in transmission when measured at an angle relative to a normal to the surface of the laminated glazing, compared to the optical quality of an equivalent laminated glazing measured at the same angle of incidence and made with the first sheet of glazing material shaped between the pair of shaping members with the positioning means in the first configuration and the second sheet of glazing material shaped between the pair of shaping members with the positioning means in the first configuration.

By using an apparatus according to the fourth aspect of the invention a first sheet of glazing material shaped between the pair of shaping members with the positioning means in the first configuration, and a second sheet of glazing material shaped between the pair of shaping members with the positioning means in the second configuration are able to be laminated together with an adhesive ply to produce a laminated glazing, in particular an automotive windscreen, having an improved optical quality in transmission when measured at an angle relative to a normal to the surface of the laminated glazing, compared to the optical quality of an equivalent laminated glazing measured at the same angle of incidence and made with the first sheet of glazing material shaped between the pair of shaping members with the positioning means in the second configuration and the second sheet of glazing material shaped between the pair of shaping members with the positioning means in the second configuration.

Preferably the first lateral position is displaced relative to the second lateral position by an amount varying between a lower limit and an upper limit. The lower limit is 0.5 mm, or 1.0 mm or 1.5 mm or 2.0 mm. The upper limit is 1.0 mm, or 1.5 mm, or 2.0 mm, or 2.5 mm, or 3.0 mm, or 3.5 mm, or 4.0 mm, or 4.5 mm, or 5.0 mm, or 5.5 mm, or 6.0 mm, or 6.5 mm, or 7.0 mm, or 7.5 mm, or 8.0 mm. For example, the first lateral position is displaced relative to the second lateral position by between 0.5 mm and 8.0 mm, more preferably between 1.5 mm and 7.0 mm, even more preferably between 1.5 mm and 6.0 mm, most preferably 1.5 and 4.0 mm. Other combination of lower and upper limit is possible.

Preferably the first longitudinal position is displaced relative to the second longitudinal position by an amount varying between a lower limit and an upper limit. The lower limit is 0.5 mm, or 1.0 mm or 1.5 mm or 2.0 mm. The upper limit is 1.0 mm, or 1.5 mm, or 2.0 mm, or 2.5 mm, or 3.0 mm, or 3.5 mm, or 4.0 mm, or 4.5 mm, or 5.0 mm, or 5.5 mm, or 6.0 mm, or 6.5 mm, or 7.0 mm, or 7.5 mm, or 8.0 mm. For example, the first lateral position is displaced relative to the second lateral position by between 0.5 mm and 8.0 mm, more preferably between 1.5 mm and 7.0 mm, even more preferably between 1.5 mm and 6.0 mm, most preferably 1.5 and 4.0 mm. Other combination of lower and upper limit is possible.

In any or all of the first, second, third and fourth aspects of the present invention the pair of shaping members is usually a complementary pair of shaping members comprising a first shaping member and a second shaping member. Usually the first and second shaping members are vertically disposed relative to each other and each is configured for vertical movement relative thereto, but the first and second shaping members may be horizontally disposed relative to one another and configured for horizontal movement relative thereto. When the first and second shaping members are vertically disposed relative to each other i.e. the first shaping member is above the second shaping member, the first shaping member is usually referred to as an upper shaping member or a male shaping member and the second shaping member is usually referred to as a lower shaping member or a female shaping member.

Suitably the first shaping member has at least one concave portion and the second shaping member has a corresponding complementary convex portion.

The first shaping member may have at least one convex portion, in which case the second shaping member has a corresponding complementary concave portion.

The first shaping member may be a full surface contact shaping member.

The second shaping member may be a full surface contact shaping member.

As is known in the art a full surface contact shaping member is configured such that the shaping member has a surface that is able to contact a major portion of, if not all of, the major surface of the sheet of glazing material that comes into contact with the shaping member.

The first shaping member may be a ring mould, configured to contact the sheet of glazing material being shaped slightly inboard of the peripheral edge of the sheet of glazing material.

The second shaping member may be a ring mould, configured to contact the sheet of glazing material being shaped slightly inboard of the peripheral edge of the sheet of glazing material.

When the first shaping member is a ring mould, preferably the second shaping member is a full surface contact mould.

When the second shaping member is a ring mould, preferably the first shaping member is a full surface contact mould.

From a fifth aspect the present invention provides a laminated glazing comprising at least two sheets of glazing material (a first sheet of glazing material and a second sheet of glazing material), joined by an interlayer structure comprising at least one (a first) sheet of adhesive interlayer material, the first sheet of glazing material, the second sheet of glazing material and the first sheet of adhesive interlayer material each having a first major surface and a second opposing major surface, the laminated glazing being configured such that the second major surface of the first sheet of glazing material faces the first major surface of the first sheet of adhesive interlayer material, and the first major surface of the second sheet of glazing material faces the second major surface of the first sheet of interlayer material, there being a first imprint on at least a portion of the first major surface of the first sheet of glazing material and substantially the same imprint on at least a portion of the first major surface of the second sheet of glazing material, wherein when viewed at zero angle of incidence to the radius of curvature of the first sheet of glazing material, the imprint on the first major surface of the first sheet of glazing material is offset from the imprint on the first major surface of the second sheet of glazing material.

The imprint on the first major surface may be produced when the initially flat sheet of glazing material is bent between a pair of complementary pressing members.

A laminated glazing according to the first aspect of the present invention has a higher degree of optical distortion when measured at normal incidence compared to when the glazing is inclined at an angle. In contrast, a conventional laminated glazing comprising a first and second press bent glass sheet, each glass sheet having been press bent individually though the same pair of complementary pressing members, has the lowest optical distortion when measured at normal incidence, and the optical quality in transmission decreases as the rake angle increases.

It should be noted that in addition to the optical distortion arising from the shaping process, there may be additional optical distortion causes by thickness variations of the adhesive sheet. These additional optical distortions still have low power at normal incidence, and higher power at increased angles of inclination (as described in Glass Processing Days, 2003, pages 502-504 and shown in FIG. 7 of said document).

In view of these additional sources of optical distortion, a laminated glazing produced according to the present invention may have lowest optical distortion at normal incidence but having a much slower rate of increase with increasing inclination angle of the laminated glazing.

The amount of offset is more than is obtainable from the conventional manufacturing tolerances. For example, the tolerance or positional accuracy of a conventional press-bending furnace is within ±0.5 mm, meaning that a sheet of glass can be positioned in the same place between a pair of press bending members to within ±0.5 mm.

Preferably the first imprint on the first major surface of the first sheet of glazing material extends over the entire first major surface of the first sheet of glazing material.

The contact between the first and/or second major surface of the sheet of glazing material and a pressing member configured to contact that particular surface may give rise to an imprint on that major surface Preferably the imprint on the first major surface of the second sheet of glazing material extends over the entire first major surface of the first sheet of glazing material.

It will be readily apparent that unless the first and second sheets of glazing material are bent at exactly the same location between a pair of shaping members, the imprint on the first and second sheets of glazing material will not be exactly the same. However given the first and second sheets of glazing material have been bent between the same pair of shaping members, there will be at least one portion of the respective major surface of each of the first and second sheets of glazing material where the imprint is the same.

Preferably the second major surface of the first and second sheets of glazing material has a second imprint thereon.

Preferably when viewed at zero angle of incidence to the radius of curvature of the first sheet of glazing material, the imprint on the second major surface of the first sheet of glazing material is offset from the imprint on the second major surface of the second sheet of glazing material.

The imprint on the second major surface of the first and second sheet of glazing material may be produced when the respective sheet of glazing material is shaped between a complementary pair of press bending members.

When one or both of the complementary press bending members is configured to apply a negative pressure therethrough, such that a sheet of heat softened glazing material may be drawn to the shaping surface of the respective complementary press bending member, this may also be responsible for enhancing at least some or all of the imprint on the respective surface of the heat softened sheet of glazing material.

When a sheet of glazing material is shaped in such a manner, one or both of the press bending members may be configured such that the entire major surface area of the sheet of glazing material is contacted.

Typically each sheet of glazing material in the laminated glazing is positioned between the press bending members in the same position relative to both the pressing members.

The amount of offset is greater than that introduced due to normal manufacturing tolerances. Typically each glass sheet can be positioned between the shaping member to a positional accuracy of less 5 mm, or less than 4 mm, or less than 3 mm, or less than 2 mm, or less than 1 mm.

The amount of offset between the imprints is greater than the repeatability of the positional accuracy. The amount of offset between the imprints is greater than 0.5 mm, or greater than 1 mm, or greater than 1.5 mm, or greater than 2 mm, or greater than 2.5 mm, or greater than 3 mm, or greater than 3.5 mm, or greater than 4 mm, or greater than 4.5 mm, or greater than 5 mm.

Laminated glazings according to the present invention may be curved in one or more directions. Preferably the radius of curvature in at least one of the one or more directions is between 500 mm and 20000 mm, more preferably between 1000 mm and 8000 mm. When the laminated glazing is curved in two or more directions, preferably two of the two or more direction of curvature are mutually orthogonal.

A glazing material suitable for use in all or any of the first, second, third, fourth and fifth aspects of the present invention is glass, in particular glass having a soda-lime-silica glass composition. For example, the first and/or second sheet of glazing material may be a sheet of soda-lime-silica glass.

A typical soda-lime-silica glass composition is (by weight), $SiO_2$ 69-74%; $Al_2O_3$ 0-3%; $Na_2O$ 10-16%; $K_2O$ 0-5%; MgO 0-6%; CaO 5-14%; SO3 0-2%; $Fe_2O_3$ 0.005-2%. The glass may also contain other additives, for example, refining aids, which would normally be present in an amount of up to 2%. The soda-lime-silica glass composition may contain other colouring agents such as $Co_3O_4$, NiO and Se to impart to the glass a desired colour when viewed in transmitted light. The transmitted glass colour may be measured in terms of a recognised standard such as BS EN410.

Embodiments of the present invention will now be described by way of example only with reference to the accompanying drawings, in which:

FIG. 6 show a schematic plan view of a conveyor of a press bending furnace;

FIG. 7 shows a side view of a portion of a press bending furnace;

FIG. 9 shows the position of a locator at two positions;

FIG. 10 shows a plan view of how two plies of glass may be offset to improve optical quality in transmission;

FIG. 11 shows a cross-sectional view of a laminated glazing where the plies have been offset prior to lamination;

Figure 1:
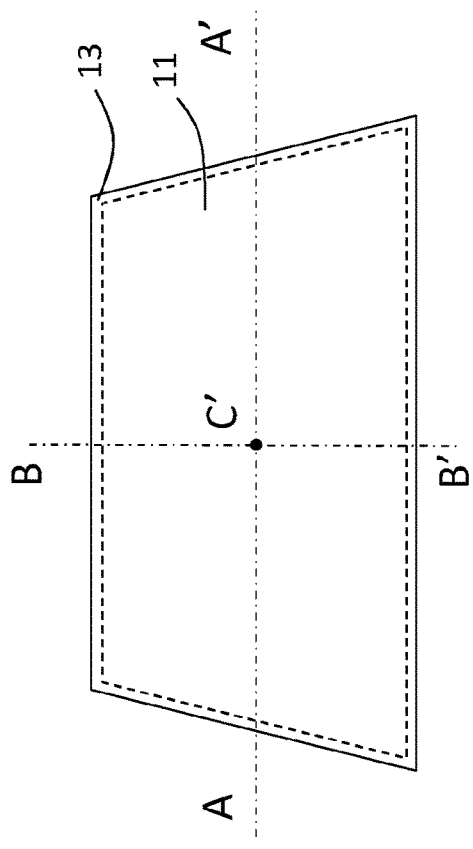
FIG. 1 shows a schematic plan view of a sheet of glazing material prior to being shaped.
Figure 2:
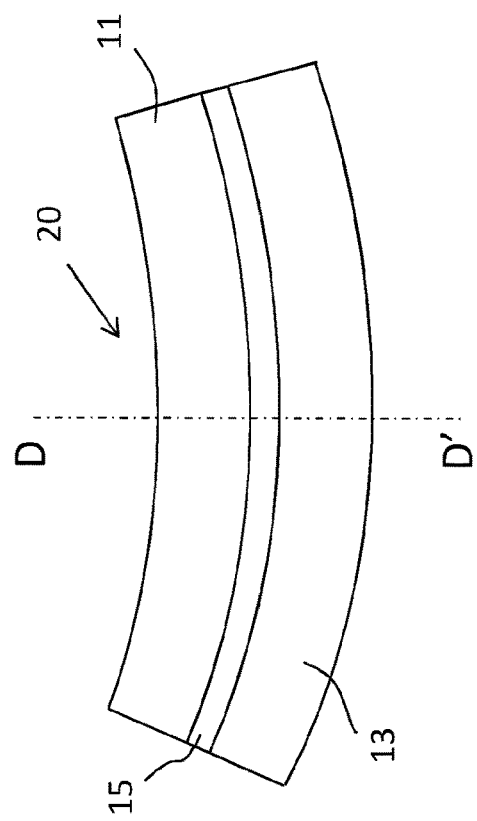
FIG. 2 shows a cross-section of a curved laminated glazing.

FIG. 1 shows a plan view of a glass sheet of the type used for a ply of a vehicle windscreen. Depending upon the radius of curvature of the bent vehicle windscreen, each of the inner and outer plies may be cut to the same peripheral dimensions. If each ply 1, 3 has the same external dimensions, then when bent the edges of the glass sheets do not exactly align in the laminated glazing. This is shown in FIG. 2, where the glass sheet 3 is the outer ply and the glass sheet 1 is the inner ply. Glass ply 1 is joined to the glass ply 3 by an adhesive sheet 5 of polyvinyl butyral (PVB). The degree of misalignment may be acceptable to a customer, especially for low radius of curvature. Furthermore there may be a polyurethane gasket or the like around the peripheral edge of the curved windscreen so that the misalignment is not seen.

The geometric centre C is shown in the major surface of the glass ply 1, 3. When bending, the intention is to position the point C on each ply 1, 3 at the same position between press bending members. The axis A-A' is suitably positioned and is parallel to the parallel edges of the glass ply 1, 3. The axis B-B' is perpendicular to the axis A-A' and is positioned mid-way between the upper and lower edges of the glass ply 1, 3.

Figure 3:
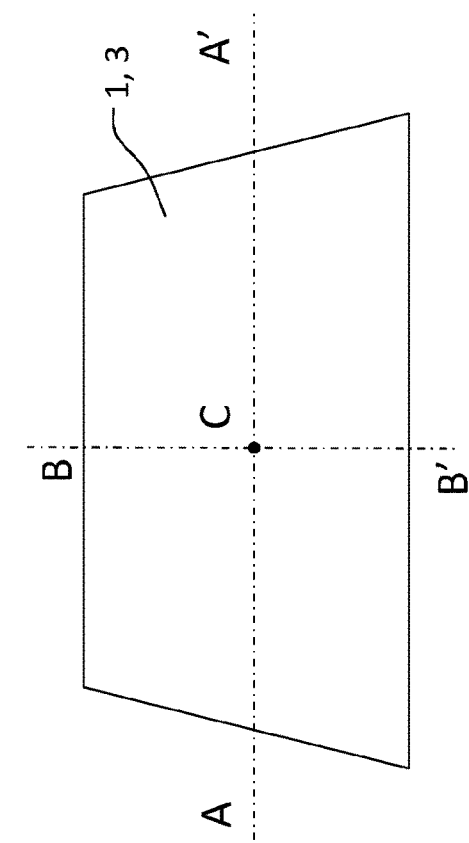
FIG. 3 shows a plan view of two glass sheets prior to being shaped.

FIG. 3 shows a plan view of glass sheets 11 and 13. Glass sheet 11 is the flat blank for the inner ply of the laminated vehicle glazing and glass sheet 13 is the flat blank for the outer ply of the laminated vehicle glazing. The external dimensions of the glass sheet 11 (shown as a dashed line) are smaller than the external dimensions of the glass sheet 13. The external dimensions of the glass sheet 11 are chosen such that the edges of the bent glass sheets align in the final laminated glazing.

Figure 4:
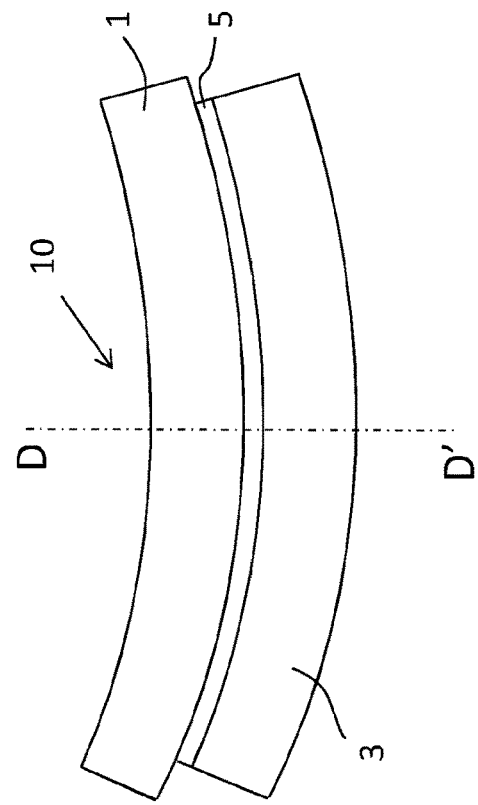
FIG. 4 shows a cross-sectional view of a laminated glazing using two curved sheets of glazing material that have the configuration shown in FIG. 3 prior to being shaped.

The edges of the individual glass sheets 1, 3 of the laminated glazing 10 shown in FIG. 2 are not aligned, whereas the edges of the individual glass sheets 11, 13 of the laminated glazing 20 shown in FIG. 4 are aligned. In FIG. 4, glass ply 11 is joined to glass ply 13 by means of adhesive sheet 15, which in this example is PVB but may be EVA.

The point C' lies at the geometric centre of each of the glass plies 11, 13. When bending, the intention is to position the point C' on each ply 11, 13 at the same position between press bending members. The axis A-A' is suitably positioned and is parallel to the parallel edges of the glass ply 1, 3. The axis B-B' is perpendicular to the axis A-A' and is positioned mid-way between the upper and lower edges of the glass ply 11, 13.

Figure 5:
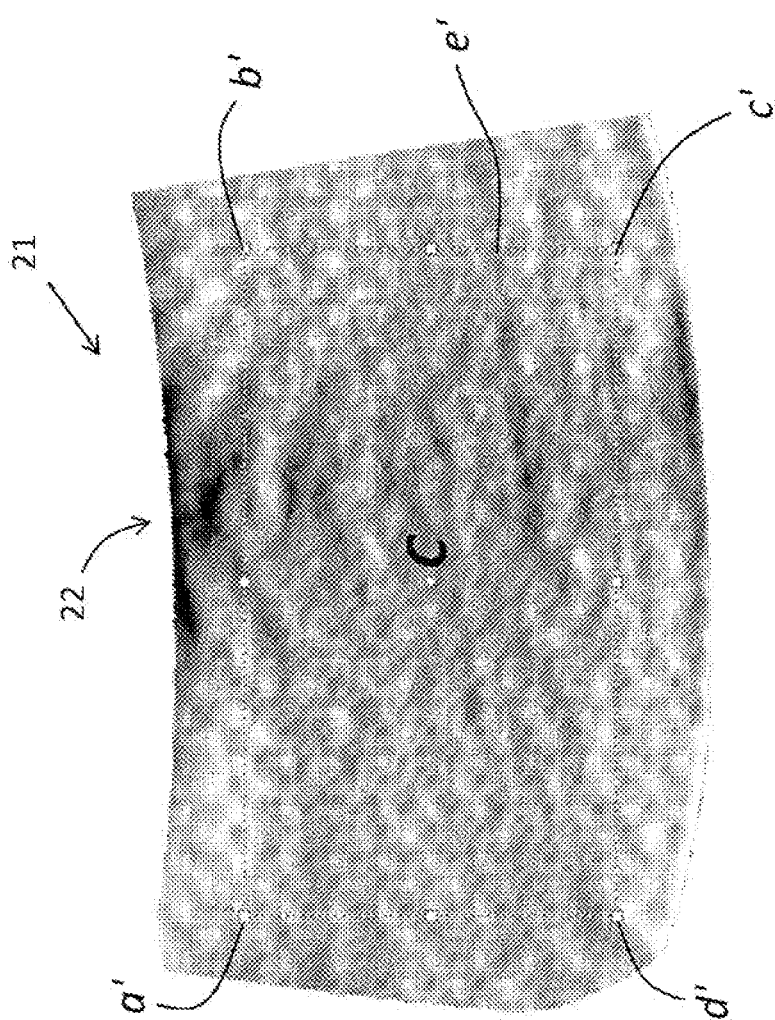
FIG. 5 shows a curvature measurement map of a glass sheet that has been press bent between a male die and a female support ring.

FIG. 5 shows a curvature measurement map 21 of a curved glass sheet that has been press bent between a male die and a female support ring. The male die has a convex shaping face covered with a woven stainless steel cloth which contacts the surface of the initially flat, heat softened glass sheet to impart a concave curvature thereto.

The curved glass sheet has a desired curvature as specified in a CAD drawing of the glazing. On the curvature measurement map 21, the deviation of actual curvature of the curved glass sheet at a given point from the desired curvature at that point (as specified by the CAD drawing) is specified by a pixel having a particular grey level i.e. a certain level of reference RGB values to indicate no deviation. That is, if there is no deviation from the desired curvature there would be a grey point having a particular shade (a reference shade) on the curvature measurement map 21. The greater the deviation of actual curvature of the curved glass sheet at a given point from the desired curvature at that point (as specified by the CAD drawing), the greater is the variation in the shade of grey for the pixel away from the shade of grey representing no deviation. Positive and negative deviations may be represented on the curvature measurement map. The area of the curvature measurement map 21 near the upper edge, as indicated by arrow 22, is almost entirely black indicating that part of the curved glass sheet has the greatest deviation from the desired curvature. In the region 22 the deviation is of the order of a few tenths of a micron.

The curvature measurement map 21 shows that instead of being smooth i.e. the curvature map is all one shade of grey, the surface of the curved glass sheet is covered with an imprint. This imprint is from the stainless steel woven cloth that covers the surface of the male die. The imprint on the glass surface may be enhanced if the male die is configured to use negative pressure reducing means capable of drawing the heat softened sheet towards the shaping surface of the male die. This type of male die is described in WO2005/033026A1. Given that the imprint is of the order of a few hundredths to a few tenths of a micron, to the human eye the surface of the curved glass sheet appears smooth.

The points a', b', c' and d' lie at the corners of a rectangle e'. At the centre of the rectangle e' is the point C. The rectangle a'b'c'd' may be particularly relevant since this is an important vision area for a vehicle windscreen.

A heat softened glass sheet that is pressed between a male die covered with a stainless steel woven cloth and the female support ring will have the imprint on the concave surface.

If the female shaping member is a full surface complementary shaping member instead of a support ring, there may be an imprint on both opposed major surfaces of the press bent glass sheet.

FIG. 6 shows a schematic plan view of part of a press bending furnace 30 and FIG. 7 shows a schematic side view of part of the furnace 30. The furnace 30 has a number of conveyor rolls 32 that define a longitudinal direction of travel, for example as shown by arrow 34. Each roller 32 rotates in a clockwise direction as shown for one roller by arrow 36. A glass sheet 31 is shown being transported on the rollers 32 in the direction of arrow 34 so as to position the glass sheet 31 between the male die 35 and the female support ring 37. The glass sheet 31 is transported by direct contact with the rollers i.e. the glass sheet 31 is not carried on a ring mould or the like prior to being positioned between the male die 35 and the female support ring 37.

The shaping surface of the male die 35 is covered with a stainless steel woven cloth. The male die 35 may be of the type described in WO2005/033026A1. The direction indicated by arrow 34 is perpendicular to the rollers 32 and parallel to the longitudinal axis of the bending furnace.

A pair of locators 38, 39 are raised when the glass sheet 31 is in the desired position between the shaping members for bending. The locators (often known as stops) are configured to act on the leading edge of the flat glass sheet 31.

Each locator 38, 39 is in electrical communication with a controller 40. The controller is used to actuate the locators at the correct time and may take inputs from suitable sensors such as photodiodes upstream thereof. Such sensors provide positional input of the glass sheet, or a portion thereof, such as an edge portion of the glass sheet, to the controller so that the controller actuates the locators to correctly position the glass sheet 31 in between the shaping members 35, 37.

Once the glass sheet 31 is supported on the female support ring 37 (by movement of the female support ring 37 relative to the rollers), the male die 35 moves relative to the female support ring 37 to press bend the glass sheet therebetween. For example, the male die 35 is moveable vertically relative to the female support ring 37 in the direction of arrow 35'. As is conventional in the art, the female support ring 37 may be segmented to permit displacement of the female support ring 37 above the level of the conveyor rolls 32, for example as described in U.S. Pat. No. 4,015,968.

After the glass sheet is bent, the glass sheet is suitably transported to a cooling furnace. For example the glass sheet may be transported by means known in the art, such as on rollers, by air flotation, or carried on a shuttle ring. In FIG. 6 and FIG. 7 the bent glass 31 is transported on rollers 42.

The locators 38, 39 have a positional accuracy which determines how consistent the bending operation is. When the control means actuates the locators ideally each locator 38, 39 should stop subsequent glass sheets 31 at the same position each time for bending between the male die 35 and the support ring 37. For example the imaginary reference point C on the glass sheet 31 should coincide with the imaginary reference point M located at the centre of the male die. The reference point C may be located at the geometric centre of the flat glass sheet 31. In practice each locator 38, 39 is able to be position to within a lateral tolerance and a longitudinal tolerance.

Figure 8:
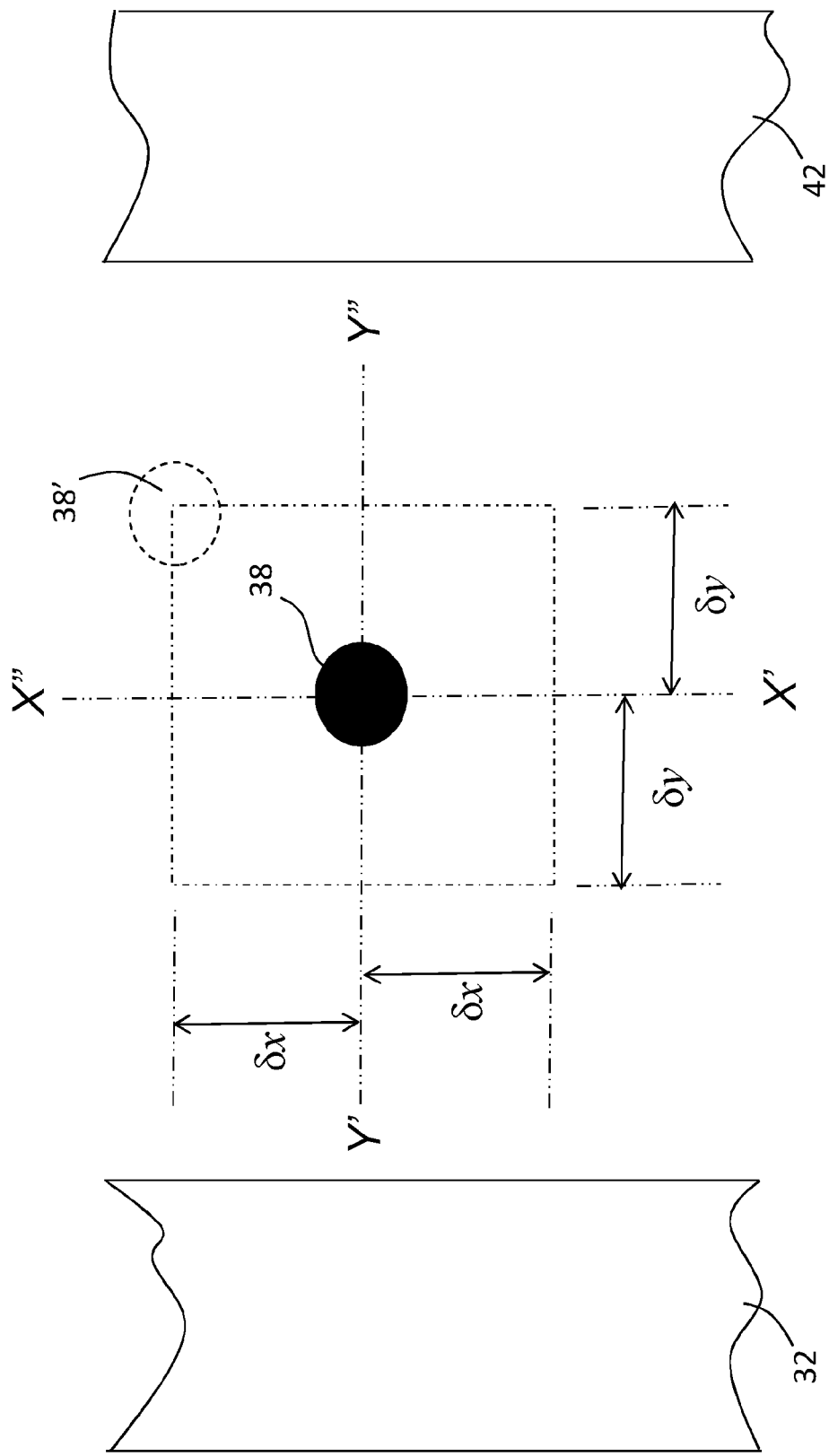
FIG. 8 shows the positional variation of a locator used to position glass sheets between shaping members of a press bending furnace.

This is illustrated in FIG. 8. FIG. 8 shows a plan view of locator 38 positioned between roller 32 and roller 42. The locator 38 is shown as having a circular perimeter but other configuration of perimeter for each locator 38, 39 may be used.

The target longitudinal position for the locator 38 is X and the target lateral position for the locator 38 is Y. The target position X lies along lateral axis X'-X" and the target position Y lies along longitudinal axis Y'-Y". The position X, Y lies at the intersection of axis X'-X" with the axis Y'-Y". The axis X'-X' is parallel to the lateral axis (or direction) of the furnace and the axis Y'-Y" is parallel to the longitudinal axis (or direction) of the furnace. Typically the rollers 32, 42 are parallel to the lateral axis of the furnace.

The positions X, Y may be measured relative to a fixed point on the furnace, for example the position of the first conveyor roller, the entrance to the furnace, etc. The lateral tolerance is ±δx and the longitudinal tolerance is ±δy. Therefore the locator 38 may be positioned at the point X, Y to within ±δx and ±δy. Shown in phantom is the locator 38' at position X+δx, Y+δy.

Note that in this example the centre point of the locator 38 is desired to be at the point X, Y but it may be some other fixed point on the locator. The dimensions of the locator may be taken into account when positioning the locator at a given point X, Y such that the reference point C on the flat glass sheet is correctly positioned between the shaping members.

In prior art systems for separately shaping two glass sheets for use as inner and outer plies in a laminated glazing such as a vehicle windscreen, the locators 38, 39 target for the same position for each ply, taking into account any dimensional change of the inner ply, as described in relation to FIGS. 3 and 4. Consequently the imprint on the surface of the glass sheets in contact with the stainless steel woven cloth covering the male die 35 is the same.

FIG. 9 shows how the locator 38 is used to position the glass sheets between the male die 35 and the female support ring 37 according to the first aspect of the present invention.

The locator 38 is shown at a first position 38(1). This position of the locator is at the intersection of axis X1'-X1" and Y1'-Y1". The axis X1'-X1" is parallel to the lateral axis of the furnace and the axis Y1'-Y1" is parallel to the longitudinal axis of the furnace. The outer ply of a vehicle windscreen is positioned by the locator at position 38(1) such that the reference point C on the outer ply is in the correct position for bending between the shaping members.

In order to consistently achieve improved optical quality in transmission for laminated windscreens installed in a vehicle at a typical installation angle off-normal, the position for bending of the inner ply for the vehicle windscreen is deliberately offset with respect to the position for bending the outer ply. The locator 38 is moved from position 38(1) to position 38(2) which lies at the intersection of axis X2'-X2" and Y2'-Y2". The axis X2'-X2" is parallel to the lateral axis of the furnace and the axis Y2'-Y2" is parallel to the longitudinal axis of the furnace. The outer ply of a vehicle windscreen is positioned by the locator at position 38(2). The position of the locator 38 is changed using the controller 40.

As described with reference to FIG. 8, the locator 38 may be positioned at position 38(1) to within ±δx and ±δy. Given that the same locator 38 is used to position both the glass sheets for the outer and inner plies of the vehicle windscreen, the locator 38 may be positioned at position 38(2) to within ±δx and ±δy.

The magnitude of the lateral separation between axis Y1'-Y1" and axis Y2'-Y2" is greater than the twice the magnitude of the lateral tolerance of the locator 38, that is $|X1-X2|>2\times|\delta x|$.

The magnitude of the longitudinal separation between axis X1'-X1" and axis X2'-X2" is greater than the twice the magnitude of the longitudinal tolerance of the locator 38, that is $|Y2-Y1|>2\times|\delta y|$.

In this example, δx is 0.5 mm, so the longitudinal tolerance is ±0.5 mm i.e. δx=±0.5 mm. Also, δy is 0.5 mm, so the lateral tolerance is ±0.5 mm i.e. δy=±0.5 mm. The lateral separation between axis Y1'-Y1" and axis Y2'-Y2" was 2.5 mm and the longitudinal separation between axis X1'-X1" and axis X2'-X2" was 2.5 mm.

The first glass sheet positioned by locator 38 at position 38(1) is shaped between the male die 35 and female support ring 37. A second glass sheet positioned by locator 38 at position 38(2) is shaped between the male die 35 and female support ring 37.

Once cooled, the first and second glass sheets are laminated together with a sheet of PVB.

The optical quality of the laminated glazing was found to have a higher quality when inclined at an angle of 60° to the vertical compared to when measured at normal incidence i.e. the laminated glazing is inclined at 0° to the vertical.

Since the locator 38 is at a first position to bend the outer ply and at a deliberately offset second position to bend the inner ply, the imprints on the major surfaces of the outer and inner plies are offset relative to each other when viewed at normal incidence.

In an alternative embodiment to that shown in FIG. 9, the longitudinal separation between axis X1'-X1" and axis X2'-X2" is less than or equal to twice the longitudinal tolerance of the locator 38 i.e. 2×δx. The axes X1'-X1" and X2'-X2" may be collinear.

In another alternative embodiment to that shown in FIG. 9, the lateral separation between axis Y1'-Y1" and axis Y2'-Y2" is less than or equal to twice the lateral tolerance of the locator 38 i.e. 2×δy. The axes Y1'-Y1" and Y2'-Y2" may be collinear.

In another alternative embodiment to that shown in FIG. 9, a first locator is used to position the first glass sheet at position 38(1) and a second different locator is used to position the second glass sheet at position 38(2).

Another way to achieve the offset between the outer and inner plies is described with reference to FIGS. 8, 10 and 11.

FIG. 10 shows two flat glass plies 51, 53. The outer glass ply 51 is positioned between the male die 35 and female support ring 37 by the locator 38 at position X, Y. The outer glass ply 51 is shaped and cooled and transported away on rollers 42.

As is conventional in the art, the inner glass ply 53 is also positioned between the male die 35 and female support ring 37 by the locator 38 at position X, Y. The inner glass ply 53 is also shaped and cooled and transported away on rollers 42.

In accordance with the second aspect of the present invention, and with particular reference to FIG. 11, prior to the lamination process, the shaped outer ply 51 is offset relative to the shaped inner ply 53 i.e. the outer ply 51 is first laid up, then a sheet of PVB 55 is placed on the shaped outer ply 51, followed by the shaped inner ply being placed on the sheet of PVB 55 but offset relative to the shaped outer ply 51. The amount of offset in relation to axis q-q' and/or r-r' should be more than twice the respective longitudinal/lateral tolerance of the locators to ensure consistently better optical quality in transmission.

The imaginary reference point M1 lies on the major surface of the outer ply 51 and is that point that was in contact with the male die 35 at imaginary point M on the surface of the male die. The imaginary reference point M2 lies on the surface of the inner ply and is that point that was in contact with the male die 35 at imaginary point M on the surface of the male die. The reference points M1, M2 are located at the geometric centre of the major surface of the inner and outer plies 51, 53.

In a conventional lamination process when the inner and outer plies are laid up for lamination the imaginary references points M1 and M2 are aligned. In this way, the resulting laminated glazing would have the edges aligned. However in accordance with the present invention the imaginary reference points M1 and M2 are deliberately offset by more than twice the magnitude of the lateral tolerance and/or longitudinal tolerance of the locators. In this way, the imprint on the major surface of the outer ply that was in contact with the male die 35 and the imprint on the major surface of the inner ply that was in contact with the male die 35 are offset relative to one another when viewed at normal incidence to the surface of the laminated glazing.

A consequence of this is that the edges of the laminated glazing 57 are not aligned, as shown in FIG. 11 and the inner ply 53 may have an overlap region 54 that extends beyond periphery of the outer ply 51 in one direction and is inboard the periphery of the outer ply in the opposite direction.

To avoid the overlap 54 the overlapping edges prior to laminating the two plies 51, 53 may be removed by cutting for example. Alternatively, the flat glass sheets prior to being shaped may be suitably cut such that when they are misaligned the edges are aligned in the resulting laminated glazing. It will be apparent that the shapes may be cut to have an outline defined by the degree of overlap between the outer and inner plies as shown in FIG. 10.

The laminated glazing may be encapsulated such that the peripheral edge of the laminate is covered with a gasket of suitable material such as polyurethane. Using encapsulation in this way hides the misaligned edges.

To illustrate the effect of misaligning the outer ply relative to the inner ply a number of laminated vehicle windscreens were made. Each windscreen has an inner ply of 2.1 mm float glass joined to an outer ply of 2.1 mm float glass via an adhesive sheet of PVB.

Each inner ply and a corresponding outer ply were made by press bending each individual glass ply between the same press bending members using substantially the same bending conditions. In particular the position of the inner ply and the outer ply between the press bending members was such that the surface imprint would align if laid up in a conventional manner during the lamination process. A suitable press bending furnace is described in WO2004/085324A1, in particular the figures and related description thereof. Other suitable press bending furnaces are known, for example as described in EP0398759A2.

Five windscreens were made where the inner ply was misaligned horizontally with respect to the outer ply. In this context, "horizontal" means the direction with respect to the windscreen in the installed position.

A test was designed to simulate the situation, where a driver looks "cross-car" through a vehicle windscreen, i.e. whilst sat in the driver's seat, the driver looks through the portion of the vehicle windscreen on the passenger side of the vehicle, as for example when observing traffic lights. When the driver looks through the glass in this way, the optical path of light has a horizontal angel of inclination to the normal of the glass surface of the order of 45°.

Each sample was tilted to 61° from the vertical to simulate an installation angle and then rotated about the vertical axis in a clockwise and anti-clockwise direction of 45°.

In order to assess the optical affects, the optical power in a region in the centre of the windscreen under test was measured, see for example the region abcd on FIG. 5. The region was approximately 300 mm×300 mm and the optical power in transmission was measured using a technique as described in WO2004/083835A1. A parameter ROC was used to define each windscreen under test. The parameter ROC is the difference between the maximum optical power and minimum optical power within a certain distance and is used to describe the observable distortions in the glass.

For each measurement angle +45° and −45°, the optical power characterised in terms of the parameter ROC in the test region of each respective windscreen was measured and an average calculated. For each angle of rotation the measured optical power characterised in terms of the parameter ROC was divided by the average optical power:

$$\text{Normalised Optical Power}(+45°) = \frac{\text{Optical Power}(+45°)}{1/2[\text{Optical Power}(-45°) + \text{Optical Power}(+45°)]}$$

$$\text{Normalised Optical Power}(-45°) = \frac{\text{Optical Power}(-45°)}{1/2[\text{Optical Power}(-45°) + \text{Optical Power}(+45°)]}$$

This test was carried out on each of the five windscreens. The five windscreens were made with a different degree of misalignment between the inner ply and the outer ply when the plies were laid up for lamination:

TABLE 1

| SAMPLE | MISALIGNMENT (mm) |
|--------|-------------------|
| A | −2 |
| B | −1 |
| C | 0 |
| D | +1 |
| E | +2 |

Figure 12:
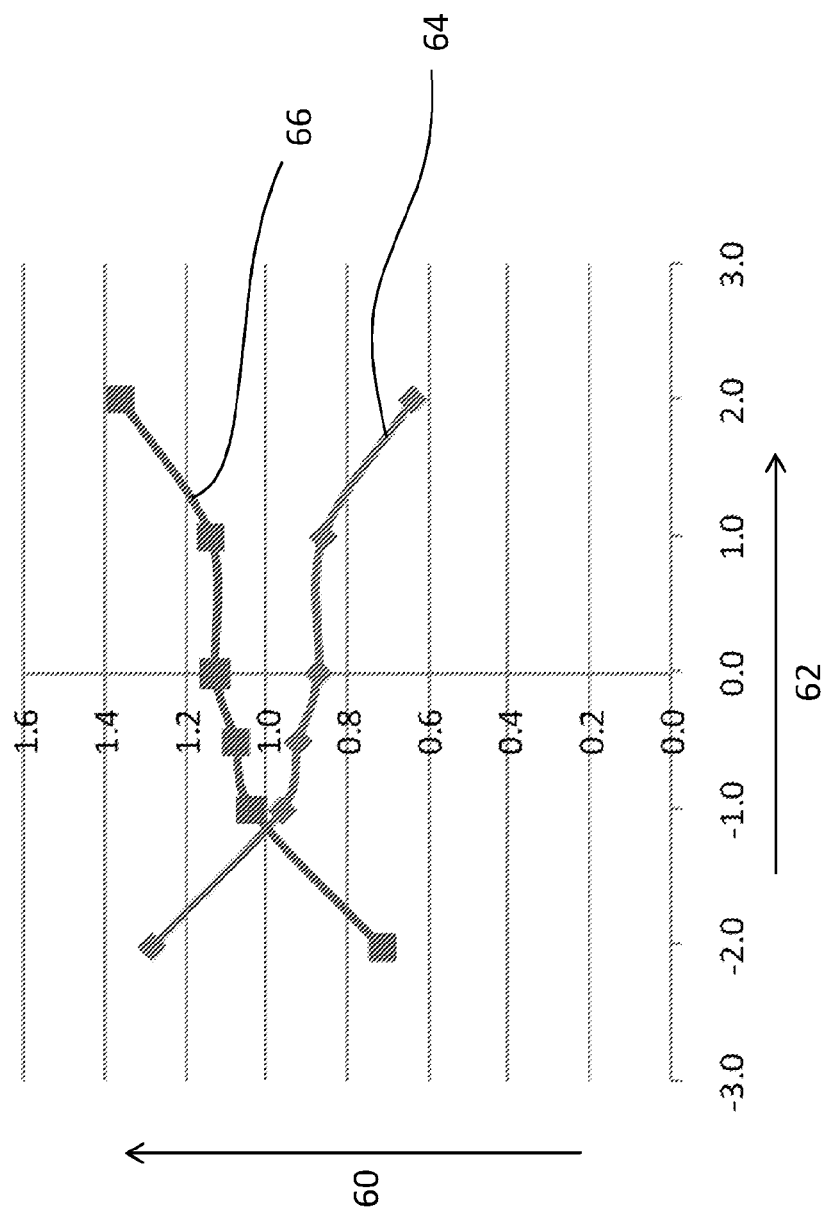
FIG. 12 shows how normalised optical power of a laminated glazing varies with misalignment between the inner and outer plies.

The results are shown in FIG. 12 which shows how the normalised optical power (in the direction of arrow 60) varies as a function of misalignment (in mm) of the inner and outer plies (in the direction of arrow 62). For clockwise rotation (shown as line 64), the normalised optical power of the windscreen reduces when the misalignment increases in a positive direction. For anti-clockwise rotation (shown as line 66), the normalised optical power reduces when the misalignment increases in the negative direction.

It would therefore be expected that as the vertical misalignment increases the optical power will reduce in a similar way.

To determine the effect of vertical misalignment, ten windscreens were made where the inner 2.1 mm glass ply was moved upwards relative to the outer 2.1 mm glass ply prior to being laminated. A positive displacement represents an upwards misalignment. In this context, upwards means the upper portion of the windscreen in the installed position at an angle of about 61° from the vertical i.e. the portion of the windscreen nearest the vehicle roof is the upper part of the windscreen.

Figure 13:
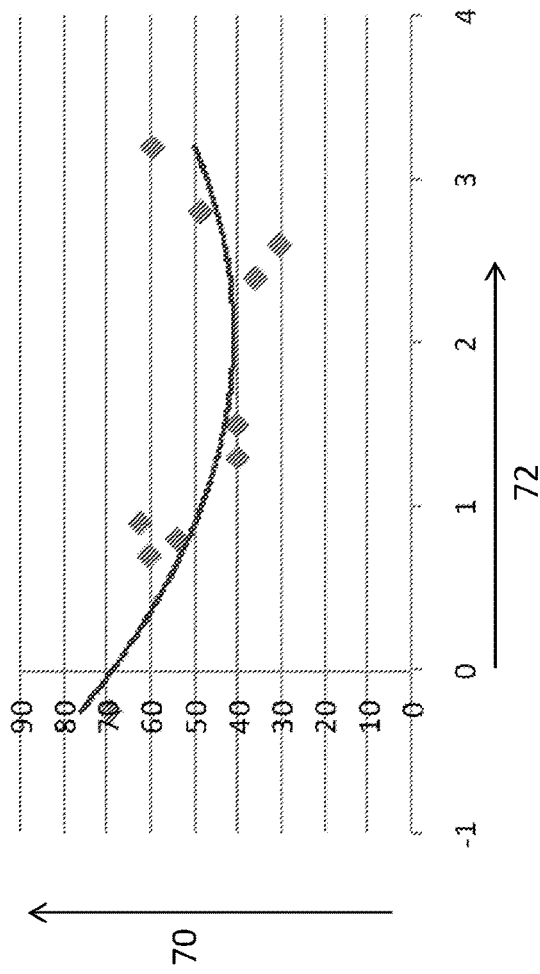
FIG. 13 shows how the optical quality in transmission (in millidioptres) varies with the amount of offset (in mm) between the inner and outer plies.

FIG. 13 shows how the ROC in millidioptres (axis 70) varies with the amount of offset in mm (axis 72) between the inner and outer plies with each windscreen installed at an angle of about 61° from the vertical. As the vertical misalignment increases, the ROC in a central zone of the windscreen is seen to vary. Samples having misalignment in the 2-3 mm region shown significantly lower distortion (30-40 millidioptres) compared to 70 millidioptres for a conventional windscreen where there is no misalignment between the inner and outer plies.

The line through the data points on FIG. 13 is a line of best fit.

To determine the effect of rake angle on optical quality a number of windscreens were made where the vertical misalignment between the inner and outer plies was changed. Four samples were made where the misalignment was −0.25 mm (line 85), +0.7 mm (line 86), +2.4 mm (line 87) and +2.6 mm (line 88) and the results are shown in FIG. 14.

Figure 14:
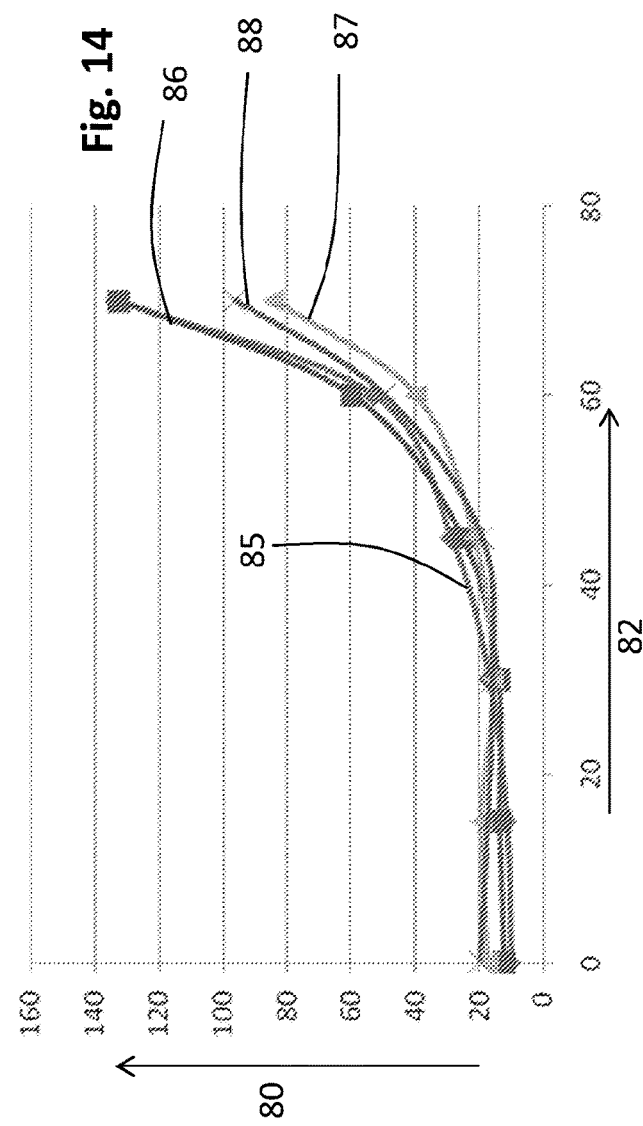
FIG. 14 shows how the optical quality in transmission (in millidioptres) varies with rake angle (angle of inclination from the vertical).

In FIG. 14, the axis 80 denotes the rake angle in degrees (°), that is, the angle of inclination with respect to the vertical. The axis 82 denotes the measured ROC value (in millidioptres) in a central zone of the windscreen i.e. a region abcd as shown in FIG. 5. At a rake angle of 0° i.e. normal incidence, samples with an offset of +2.4 mm and +2.6 mm show higher values of ROC in the central zone compared to a windscreen manufactured in a conventional manner.

As the rake angle increases, the +2.4 mm (line 87) and +2.6 mm (line 88) samples exhibit a minimum in ROC at around 30° rake angle. At a rake angle of 70° the samples +2.4 mm (line 87) and +2.6 mm (line 88) have significantly lower ROC compared to the samples with little misalignment (80-100 millidioptres compared to >120 millidioptres).

Without being bound by theory, one explanation for the optical power not having a minimum at zero millidioptres is that there is still some optical distortion caused by the PVB adhesive sheet, in particular thickness variations of the PVB sheet.

The examples above demonstrate that when the inner and outer plies are bent using a conventional press bending furnace, by deliberately offsetting the bent plies when they are laid up for lamination can result in a laminated glazing having a better optical quality when measured at an installation angle (i.e. around 60° from the vertical) compared to when measured at normal incidence (i.e. at 0° from vertical).

It would be expected that similar behaviour would be observed if the inner and outer glass plies were offset with respect to each other when each ply was press bent between the shaping members. Consequently the inner and outer plies would be deliberately press bent at different position between the shaping members.

The present invention provides particular application for the production of vehicle windscreens, especially windows for cars. Such windows typically comply with the requirements of ECE R43.

The invention claimed is:

1. A method of making a laminated glazing comprising
   (i) transporting a first sheet of glass having a major surface having a geometric centre in a first direction between a complementary pair of moulding members comprising a first shaping member and a second shaping member, the first shaping member having a least one concave portion and being a ring mould or a full surface contact mould and the second shaping member being a full surface contact shaping member having a corresponding complementary convex portion;
   (ii) stopping the first sheet of glass such that the first sheet of glass is stopped at a first position for bending between the complementary pair of moulding members, wherein the geometric centre of the major surface of the first sheet of glass is positioned relative to the complementary pair of moulding members;
   (iii) shaping the first sheet of glass between the complementary pair of moulding members;
   (iv) transporting the first sheet of glass away from between the complementary pair of moulding members;
   (v) transporting a second sheet of glass between the complementary pair of moulding members, the second sheet of glass having a major surface having a geometric centre;
   (vi) stopping the second sheet of glass such that the second sheet of glass is stopped at a second position for bending between the complementary pair of moulding members, wherein the geometric centre of the major surface of the second sheet of glass is positioned relative to the complementary pair of moulding members,
   (vii) shaping the second sheet of glass between the complementary pair of moulding members,
   (viii) transporting the second sheet of glass away from between the complementary pair of moulding members; and
   (ix) using suitable lamination conditions to laminate the first sheet of glass to the second sheet of glass via at least one adhesive sheet;
   wherein steps (ii) and (iii) take place before steps (vi) and (vii);
   wherein the stopping of the first sheet of glass at the first position for bending in step (ii) and the stopping of the second sheet of glass at the second position for bending at step (vi) are each performed with a longitudinal tolerance in a direction parallel to the first direction such that a geometric centre of a major surface of a reference sheet of glazing material is positionable at a target location in a direction parallel to the first direction to within the longitudinal tolerance,
   wherein the stopping of the first sheet of glass at the first position for bending in step (ii) and the stopping of the second sheet of glass at the second position for bending at step (vi) are each performed with a lateral tolerance in a direction perpendicular to the first direction such that the geometric centre of the major surface of the reference sheet of glazing material is positionable at the target location in the direction perpendicular to the first direction to within the lateral tolerance, and
   wherein the first position for bending is offset from the second position for bending such that the position of the geometric centre of the major surface of the first sheet of glass relative to the complementary pair of moulding members at step (ii) is offset from the position of the geometric centre of the major surface of the second sheet of glass relative to the complementary pair of moulding members at step (vi) by a longitudinal displacement in a direction parallel to the first direction being greater than a magnitude of the longitudinal tolerance and/or by a lateral displacement in a direction perpendicular to the first direction being greater than a magnitude of the lateral tolerance such that there is a corresponding offset, when the laminated glazing is viewed at zero angle of incidence to a radius of curvature of the first sheet of glazing material, between an imprint on the major surface of the first sheet of glazing material caused by contact with one of the complementary pair of moulding members and an imprint on the major surface of the second sheet of glazing material caused by contact with the one of the complementary pair of moulding members.

2. The method according to claim 1, wherein the magnitude of the lateral tolerance is less than 2.0 mm.

3. The method according to claim 1, wherein the magnitude of the longitudinal tolerance is less than 2.0 mm.

4. The method according to claim 1, wherein the lateral displacement is between 0.5 mm and 8.0 mm.

5. The method according to claim 1, wherein the longitudinal displacement is between 0.5 mm and 8.0 mm.

* * * * *